June 3, 1969  H. M. GUETTERMAN  3,447,291
DETACHABLE MOWER BLADE
Filed Dec. 15, 1966
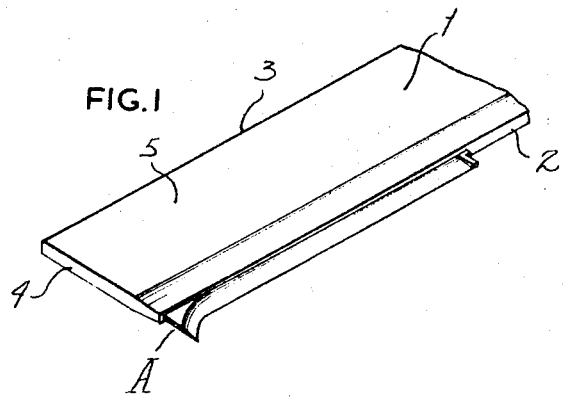
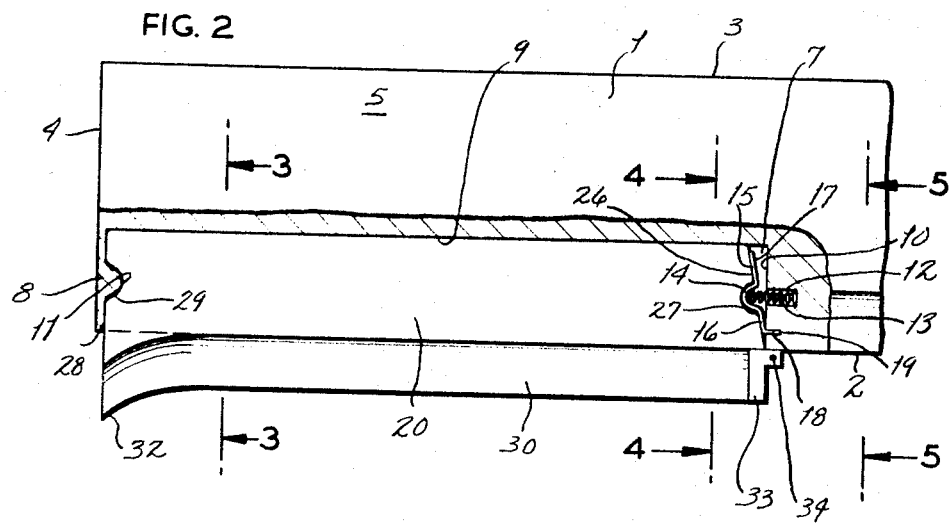
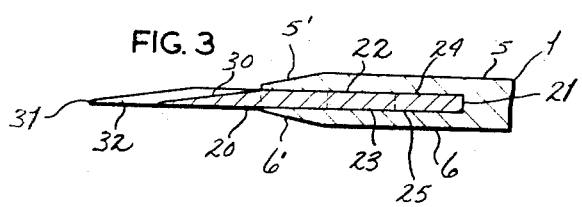
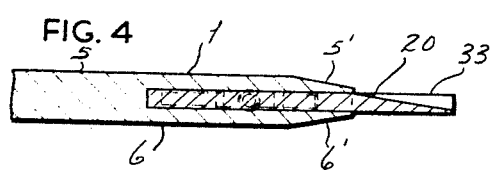
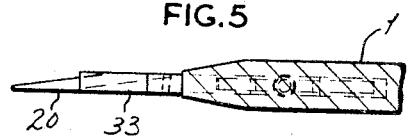
INVENTOR
HENRY M. GUETTERMAN
BY Ralph W. Kalish
ATTORNEY

United States Patent Office 3,447,291
Patented June 3, 1969

3,447,291
DETACHABLE MOWER BLADE
Henry M. Guetterman, 5601 Concordia Road,
Belleville, Ill. 98004
Filed Dec. 15, 1966, Ser. No. 602,097
Int. Cl. A01d 55/18
U.S. Cl. 56—295                9 Claims

ABSTRACT OF THE DISCLOSURE

A cutter blade for removable disposition within a socket provided in the cutter arm or blade support of agricultural equipment designed for mowing, which blade is provided with female portions for reliably engaging cooperating male members within the socket.

Background of the invention

This invention relates to cutters for general agricultural use and, in particular, to a cutter having a detachable blade.

Heretofore, it has been recognized that with cutting machinery for agricultural use, including lawn mowers, as well as the more heavy mowing equipment, there has been a problem with maintaining the cutter blades in a sharpened, effective condition. Such blades tend to become dull through usage, resulting in "down time" for such equipment for blade sharpening. Blades for this type of equipment have been consistently of the fixed character in that the same are fixedly mounted so that the entire support structure therefor must be removed to allow access to the blades for sharpening. Accordingly, during the periods requisite for such grinding or like procedures, the related equipment is unavailable for usage.

Thus, there has been the need for providing a demountable blade in order that when such blades become dull they may be easily and quickly replaced so that no cessation of operation of the equipment occurs, as well as thereby conducing to the simplicity of the sharpening procedure.

Summary of invention

It is an object of the present invention to provide a blade for detachable engagement within a mower, as used for cutting grass, grain, and the like, whereby the same may be easily removed and installed.

It is another object of the present invention to provide a detachable mower blade, the use of which facilitates sharpening procedures so that the same may be effected expeditiously with minimal effort in removal of the blade and in sharpening of the same.

It is a further object of the present invention to provide a detachable mower blade which may be utilized in existing equipment without costly modification thereof; which may be most economically produced; the use of which will conduce to the substantially continuous efficient operation of the related equipment; and which is durable and reliable in usage.

Brief description of the drawings

FIGURE 1 is a perspective, fragmentary view of the cutting arm of a mower mounting a blade constructed in accordance with and embodying the present invention.

FIGURE 2 is a top plan view with the arm partly broken away.

FIGURE 3 is a vertical section taken on the line 3—3 of FIGURE 2.

FIGURE 4 is a vertical transverse section taken on the line 4—4 of FIGURE 2.

FIGURE 5 is a vertical section taken on the line 5—5 of FIGURE 2.

Description of the preferred embodiment

Referring now by reference characters to the drawing which illustrates the preferred embodiment of the present invention, A generally designates a blade for supported disposition on a cutting arm 1 which may be of the type utilized in rotary lawn mowers, such as that described and set forth in my copending application Ser. No. 545,064, filed Apr. 25, 1966 for a Lawn Mower with a Yieldably Mounted Blade. However, it is to be understood that cutting arm 1 is shown herein for illustrative purposes only since the present invention is usable with mowers of all types other than just rotary lawn mowers.

Cutting arm 1 is of generally rectangular cross section having a leading edge 2, a parallel rearward or trailing edge 3, an outer end wall 4, and top and bottom surfaces 5, 6, respectively. Formed in cutting arm 1 is an elongated blade socket 7 opening through leading edge 2 and having its outer wall, as indicated at 8, integral with end wall 4. Said socket 7 comprises a rearward wall 9 axially parallel with cutter arm 1 and an inner wall 10 parallel with outer wall 8. Projecting from the central portion of the inner face of outer wall 8 is a protuberance 11, while inner wall 10 is provided with a cylindrical recess 12 in substantial axial alignment with said protuberance 11. Disposed within said recess 12 is a helical spring 13, which at its inner end bears against the base of said recess 12 and at its outer end projects beyond inner wall 10 and into the socket 7 for bearing engagement against the inner or concave face of a concavo-convex extension 14 provided substantially centrally of a leaf spring 15 having planarwise aligned forwardly and rearwardly extending legs 16, 17. Said leg 16 at its forward end portion is bent to provide a finger 18, which is fittedly accepted within a notch 19 formed in inner wall 10 between recess 12 and the socket opening for anchoring said spring 15. Leg 17 of spring 15 terminates spacedly from wall 9 so as to avoid obstructing contact therewith for purposes presently appearing. Thus, by reason of the bias of spring 13 and the mounting of leaf spring 15, the latter will be canted for swinging about its anchor in a direction generally toward outer wall 8.

Cutting blade A, as will now be shown, is designed for facile and reliable reception within socket 7, comprising a base portion, indicated 20, having a rearward edge 21, and top and bottom faces 22, 23. The height of said base portion 20 is substantially the same as that of socket 7 so that said base portion 20 is snugly received therein with rearward edge 21 abutting rear wall 9 and top and bottom surfaces 22, 23 surfacewise engaging the confronting portions of said socket 7, as indicated at 24, 25, respectively.

Base portion 20, in its outer region, is of like length as socket 7, but its normally inner side face, as designated 26, inclines rearwardly and outwardly so that rearward edge 21 is of less length than rearward wall 9 of socket 7. Substantially intermediate its length, inner side face 26 of base portion 20 embodies a concave recess 27 complementary to extension 14 of leaf spring 15 for reception thereof when said blade A is in mounted, operative position (FIGURE 2). Base portion 20 of blade A at its outer end, designated 28, contains a recess 29 of complementary configuration to protuberance 11 for snug reception of the latter when blade A is in mounted disposition.

The forward or normally outer region of base portion 20 terminates in alignment the portions of leading edge 2 of cutter arm 1 adjacent socket 7 so that the portion of blade A projecting beyond leading edge 2 is operational, being downwardly and forwardly beveled or inclined, as at 30, for termination in a relatively fine cutting edge 31. At its outer end, the operational portion of blade A is curved forwardly, as at 32, for enhancing the cutting action by direction of the grass or grain to be cut. On its inner edge, the operational portion of blade 20 mounts a generally L-shaped handle 33 which in one leg contains a tool receiving opening 34 for facilitating manipulation of blade A from and into engaged disposition with respect to cutter arm 1.

By the unique construction of blade A and socket 7, blade A may be easily engaged within the latter in a fully reliable and operationally effective manner by the user of the related equipment, thereby obviating costly resort to the services of skilled individuals.

Blade A may be installed within the empty socket 7 in the following manner: outer end 28 of the base portion 20 of blade A is inserted into socket 7 for substantial engagement of recess 29 and protuberance 11, with the opposite or inner end portion of base 20 being held against inward movement by leaf spring 15. With the outer end so disposed, the user, either by inserting a tool within aperture 34 or by gripping handle 33, will then cause the inner end portion of base 20 to move rearwardly within socket 7 against the bias of leaf spring 15 until rearward edge 21 is in abutment against rear wall 9 of socket 7. By such movement spring extension 14 will be received within recess 27 thereby effecting positive engagement between blade 20 and said spring 15. Upon the abutment of rear edge 21 against rear wall 9, the interengagement of protuberance 11 and recess 28 will be completed so that by such engagement and that of spring extension 14 within recess 27, blade A will be firmly secured against undesired displacement relative to socket 7 so that cutting edge 31 will be firmly supported during operation.

By reason of the tension placed upon leaf spring 15, and hence coil spring 13, through rearward movement of blade A, the said springs will cooperate to urge blade A outwardly against end wall 8, further enhancing the close reception of protuberance 11 within recess 28. It will be further recognized that during operation of the mower embodying arm 1, which latter will thus describe a rotary motion, a centrifugal force will be developed which will have the added effect of urging blade A into reliable mounted condition.

Blade A may be quite easily removed from socket 7 for replacement purposes by the simple expedient of inserting a suitable hand tool within aperture or opening 34 to use same for application of a forward and outward pulling force so as to swing, as it were, the inner end of base 20 of blade A through the socket opening and in the direction toward the outer extremity of arm 1 with consequent inward forcing of springs 13 and 15 to allow of disengagement. Thereupon the outer end of base 20 will be accorded ample space within which to bring about a disengagement between protuberance 11 and recess 28.

It will thus be seen that blade A may be quite easily disposed within socket 7 in a secure manner for operation and may be easily removed therefrom, such as for replacement or for sharpening, which latter may be easily accomplished in the customary manner.

With reference particularly to FIGURES 3, 4 and 5, it will be seen that the upper and lower surfaces 5, 6, respectively, of cutter arm 1 may be convergingly inclined at their outer ends, as at 5', 6', respectively, for general conformity to the operational portion 30 of blade A.

From the foregoing it is apparent that the present invention is suitable for utilization with all types of blade supports as used on agricultural equipment, whether for home or farm use.

It should be understood that changes and modifications in the formation, construction, and arrangement and combination of the several parts of the detachable mower blade may be made and substituted for these herein shown and described without departing from the nature and principle of my invention.

Having thus described my invention, what I claim and desire to obtain by Letters Patent is:

1. In a mower, the improvement comprising in combination a cutting blade support arm, said arm having a cutting blade-receiving socket, a cutting blade detachably received within said socket, and cooperating means provided on said support arm and said blade for releasably maintaining said blade in received condition, said socket being elongated and being defined by a rearward wall and inner and outer end walls, said cutting blade having a base portion dimentioned for reception within said socket, said cutting blade further having an operational portion for extension beyond said socket.

2. In a mower, the improvement as defined in claim 1 and further characterized by the outer wall of said socket having a male member projecting into said socket, said cutter blade having a female element provided on its base portion engageable with said male member.

3. In a mower, the improvement as defined in claim 2 and further characterized by said cooperating means comprising a recess provided on the inner end of the base portion of said cutter blade, a boss-like member engageable within said recess and being mounted upon the inner wall of said socket, and spring means urging said boss into engaged condition.

4. In a mower, the improvement as defined in claim 3 and further characterized by said boss-like member being of concavo-convex cross section and being mounted on a leaf spring having planar aligned extensions for abutting the confronting edge margins of the base portion of the cutter blade.

5. In a mower, the improvement as defined in claim 4 and further characterized by a coil spring mounted on the inner wall of said socket being in bearing relationship with respect to the boss-like member of the leaf spring for urging same toward the cutter blade.

6. In a mower, the improvement as defined in claim 5 and further characterized by said leaf spring being secured at one end and free at its opposite end which is proximate the rearward wall of the recess.

7. In a mower, the improvement as defined in claim 6 and further characterized by the edge of said base portion of the cutter blade proximate the inner end of said socket being rearwardly and outwardly inclined whereby the rearward edge of said cutter blade is of less length than the outer edge.

8. In a mower, the improvement as defined in claim 7 and further characterized by the operational portion of said cutter blade being downwardly beveled, there being a tool-receiving handle portion provided at the inward end of said operation portion.

9. In a mower, the improvement as defined in claim 8 and further characterized by the outer end of said operational portion of the cutter blade being vertically curvate.

References Cited

UNITED STATES PATENTS 2,869,311   1/1959   Beeston _____ 56—295
3,097,468   7/1963   Johnson _____ 56—295

ANTONIO F. GUIDA, *Primary Examiner.*